(12) United States Patent
Ootera et al.

(10) Patent No.: US 8,956,560 B2
(45) Date of Patent: Feb. 17, 2015

(54) METHOD OF MANUFACTURING MOLD (75) Inventors: Yasuaki Ootera, Yokohama (JP); Yoshiyuki Kamata, Tokyo (JP); Naoko Kihara, Kawasaki (JP); Yoshiaki Kawamonzen, Machida (JP); Takeshi Okino, Yokohama (JP); Ryosuke Yamamoto, Kawasaki (JP); Tomoyuki Maeda, Kawasaki (JP); Norikatsu Sasao, Tokyo (JP); Akiko Yuzawa, Kawasaki (JP); Takuya Shimada, Yokokohama (JP); Hiroyuki Hieda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 340 days.

(21) Appl. No.: 13/423,543

(22) Filed: Mar. 19, 2012

(65) Prior Publication Data
US 2013/0069272 A1     Mar. 21, 2013

(30) Foreign Application Priority Data

Sep. 16, 2011  (JP) ................. P2011-203435

(51) Int. Cl.
*H01L 21/00*  (2006.01)
*B29C 33/38*  (2006.01)
*G11B 5/855*  (2006.01)

(52) U.S. Cl.
CPC ............ *B29C 33/3857* (2013.01); *G11B 5/855* (2013.01)
USPC .......................................... 264/225; 264/219

(58) Field of Classification Search
CPC ........................................................ G03F 7/00
USPC .................................................. 264/219, 225
See application file for complete search history.

(56) References Cited

U.S. PATENT DOCUMENTS

| 2008/0277826 A1* | 11/2008 | Chou et al. .................. 264/293 |
| 2009/0092803 A1 | 4/2009 | Bita et al. |
| 2010/0124638 A1* | 5/2010 | Xiao et al. ................ 428/195.1 |
| 2010/0149673 A1* | 6/2010 | Ichikawa et al. ................ 360/31 |

FOREIGN PATENT DOCUMENTS

| CN | 101913554 | 12/2010 |
| JP | 2010-160874 | 7/2010 |
| JP | 2010-123239 | 6/2012 |

OTHER PUBLICATIONS

Office Action mailed Jul. 16, 2013 in counterpart Japanese Patent Application No. 2011-203435 and English-language translation thereof.

* cited by examiner

*Primary Examiner* — Galen Hauth
(74) *Attorney, Agent, or Firm* — Nixon & Vanderhye, P.C.

(57) ABSTRACT

In one embodiment, a method of manufacturing a mold includes: forming a first layer having an affinity to a second polymer on a substrate having an affinity to a first polymer; forming first and second openings in the first layer; filling a resist in the second openings and hardening the resist to obtain a hardened resist; and forming a second layer containing a block copolymer and causing it to self-assemble.

11 Claims, 10 Drawing Sheets

| MOLECULAR WEIGHT | FIRST OPENING (DIAMETER r = 15 nm) | SECOND OPENING (WIDTH D = 60 nm) |
|---|---|---|
| 15000 | O | O |
| 24000 | X | O |
| 32000 | X | O |
| 60000 | X | O |
| 78000 | X | X |

FIG. 7

| VISCOSITY [mPa·s] | FIRST OPENING (DIAMETER r = 15 nm) | SECOND OPENING (WIDTH D = 60 nm) |
|---|---|---|
| 100 | O | O |
| 300 | O | O |
| 1500 | X | O |
| 2000 | X | O |
| 10000 | X | O |
| 15000 | X | X |

METHOD OF MANUFACTURING MOLD

CROSS-REFERENCE TO RELATED APPLICATION

This application is based upon and claims the benefit of priority from Japanese Patent Application No. 2011-203435, filed on Sep. 16, 2011; the entire contents of which are incorporated herein by reference.

FIELD

Embodiments described herein relate generally to a method of manufacturing a mold and a method of manufacturing a magnetic recording medium.

BACKGROUND

As one means for densifying a magnetic disk, a bit patterned medium (BPM) is under review. The BPM has a magnetic area with magnet dots and a non-magnetic area without magnetic dots. Partitioning the magnetic area into magnetic dots to suppress the bit inversion due to thermal fluctuation, thereby enabling improvement in recording density. Further, the non-magnetic area, in combination with the magnetic area, can be used as a servo area.

In a BPM medium as a next-generation magnetic recording medium (HDD medium), fine and dense magnetic dots are required here. It is also necessary to accurately partition the magnetic area and the non-magnetic area.

However, it is not always easy to accurately form the magnetic area with fine and dense magnetic dots and the non-magnetic area without magnetic dots.

DETAILED DESCRIPTION

In one embodiment, a method of manufacturing a mold includes: forming a first layer having a greater affinity to a second polymer than to a first polymer, on a substrate having a greater affinity to the first polymer than to the second polymer; forming first openings and second openings in the first layer, the second opening being larger in size than the first opening; filling a resist in the second openings and hardening the resist to obtain a hardened resist; forming a second layer containing a block copolymer having the first and second polymers, in the first openings and on the first layer; causing the block copolymer to self-assemble to form a dot row arranged corresponding to the first openings and containing the first polymer; removing the hardened resist; processing the substrate using the dot row as a mask to form a mold having a first area with a shape corresponding to the dot row and a flat second area corresponding to the second openings; and removing the first and second layers.

Hereinafter, embodiments will be described in detail referring to the drawings.

Figure 1:
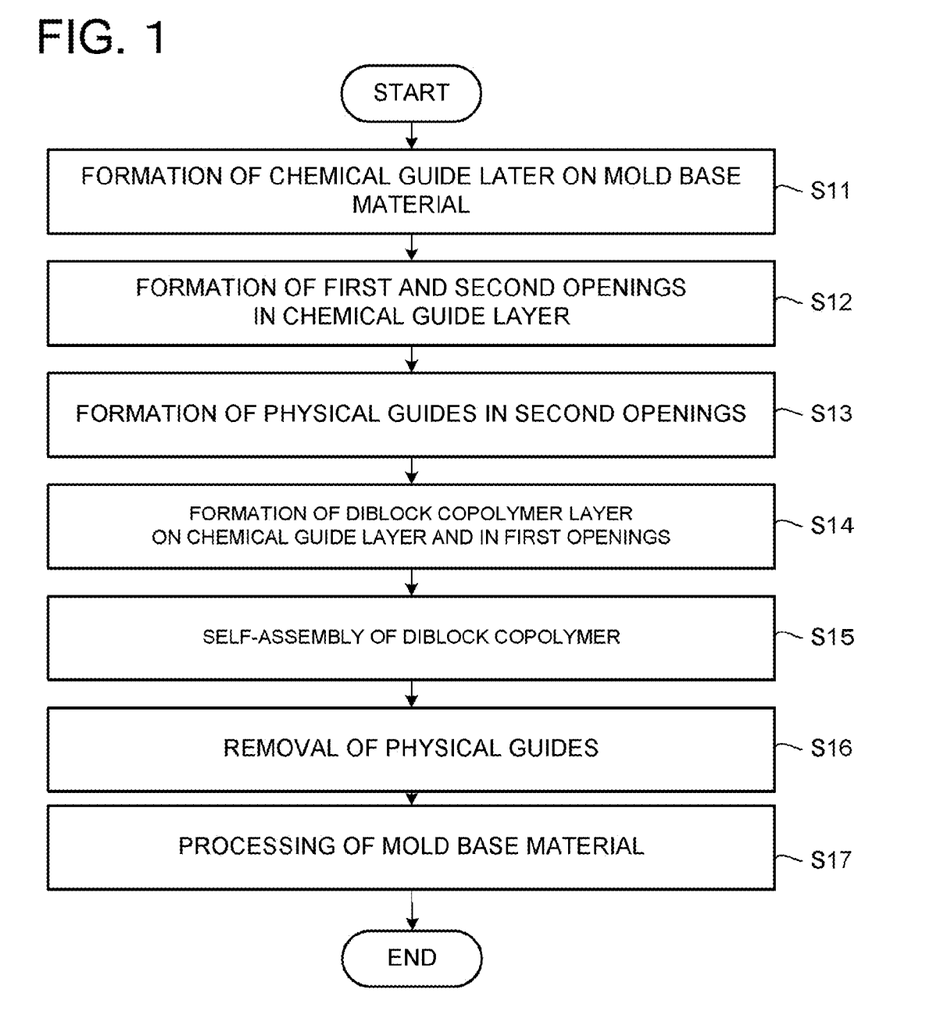
FIG. 1 is a flowchart illustrating the procedure of manufacturing a mold M according to an embodiment.

FIG. 1 is a flowchart illustrating the procedure of manufacturing a mold M according to an embodiment. FIG. 2A to FIG. 2L are sectional views illustrating the states of the mold M manufactured by the procedure illustrated in FIG. 1. FIG. 3A to FIG. 3D are perspective views illustrating the states of the mold M manufactured by the procedure illustrated in FIG. 1. FIG. 4A to FIG. 4C are views illustrating the procedure of manufacturing a magnetic recording medium using the mold M.

The mold M can be used as an imprint mold for manufacturing BPM. As illustrated in FIG. 1 and so on, the mold M is manufactured as follows.

Figure 2A:
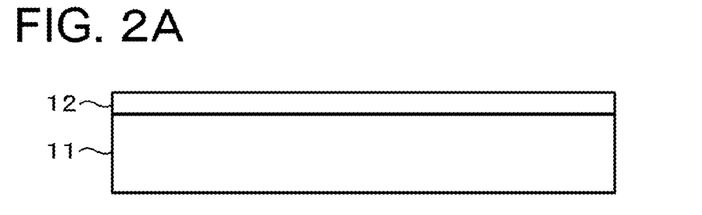
FIGS. 2A to 2L are views illustrating the states of the mold M manufactured by the procedure illustrated in FIG. 1.
Figure 3A:
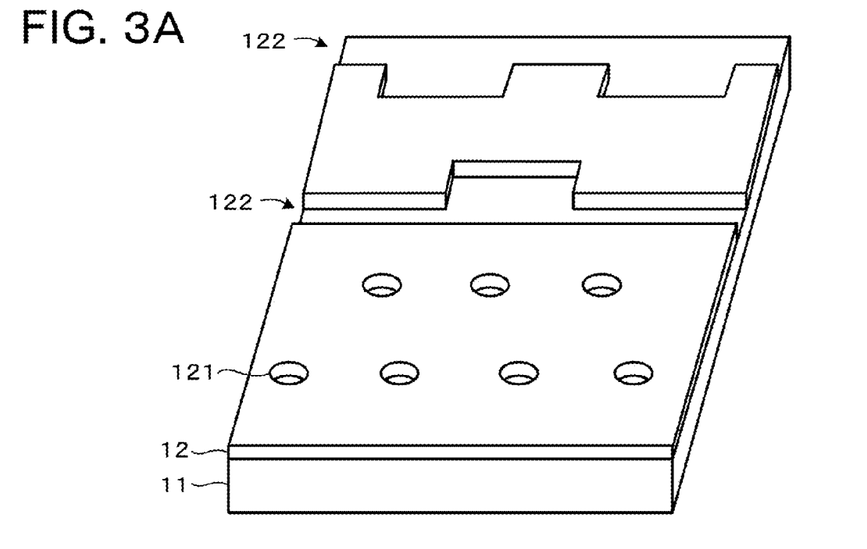
FIGS. 3A to 3D are views illustrating the states of the mold M manufactured by the procedure illustrated in FIG. 1.

(1) Formation of a Chemical Guide Layer (a First Layer) 12 on a Mold Base Material (a Substrate) 11 (Step S11, FIG. 2A).

A chemical guide layer 12 is formed on a mold base material 11. The mold base material 11 is a raw material for forming the mold M. The mold M having dots (small projections) 111 is formed utilizing self-assembly of a diblock copolymer BP as described later (see FIG. 2L).

The diblock copolymer BP is obtained by block polymerization of a polymer (macromolecule) P1 (for example, PDMS (polydimethylsiloxane)) and a polymer P2 (for example, PS (poly styrene)). Examples of the diblock copolymer BP include, for example, PS (poly styrene)-PDMS (polydimethylsiloxane), PS-PMMA (polymenthyl methacrylate), PMMA-PMAPOSS (polymethacrylate containing polyhedral oligomeric silsesquioxane), PS-PEO (polyethylene oxide).

The diblock copolymer BP self-assembles by annealing under a certain condition. More specifically, the polymers P1, P2 cause micro phase-separation in which, for example, the polymer P1 aggregates into a sphere shape (or a columnar shape or a lamellar shape) in the polymer P2. In this case, the polymer P1 can be made to aggregate into a sphere shape at a predetermined pitch (for example, 30 nm) by selecting appropriate constituent materials and molecular weights of the polymer P1, P2 (formation of rows of dots (small aggregates) of the polymer P1).

The use of the self-assembly of the diblock copolymer BP enables formation of a larger-area pattern on the order of nanometers in a short time (for example, about several minutes to several hours). The self-assembly is greatly superior to electron beam exposure requiring time of several days to several weeks. Further, the self-assembly does not require expensive facilities unlike an electron beam exposure apparatus and is thus advantageous in terms of facility cost.

The mold base material 11 is made of a material having a greater affinity to the first polymer P1 than to the second polymer P2 in the diblock copolymer BP. Examples of the material include, for example, Si, quartz, glass, plastic, metal (Ni, stainless steel or the like).

Note that the surface of the mold base material 11 only needs to be made of a material having a greater affinity to the first polymer P1 than to the second polymer P2.

The chemical guide layer 12 is made of a material having a greater affinity to the second polymer P2 than to the first polymer P1. Examples of the material include, for example, PS (poly styrene), PDMS (polydimethylsiloxane), PMMA (polymenthyl methacrylate), and a silane coupling agent.

Note that the surface of the chemical guide layer 12 only needs to be made of a material having a greater affinity to the second polymer P2 than to the first polymer P1.

It is desirable that the chemical guide layer 12 is chemically anchored to the constituent material of the mold base material 11 being the base therefor. The bonding of the chemical guide layer 12 and the mold base material 11 becomes stronger to lead to a wider range of applicable etching solutions used for removing a mask resist layer 13 as will be described later.

For example, use of a PS molecule having an alkoxy group as the material of the chemical guide layer 12 enables chemical anchoring of the chemical guide layer 12 to the mold base material 11. The alkoxy group of the PS molecule becomes a silanol group by hydrolysis. The silanol group reacts with a hydroxyl group on the surface of the mold base material 11 (dehydration/condensation reaction), whereby the chemical guide layer 12 is anchored to the mold base material 11.

(2) Patterning of the Chemical Guide Layer 12 (Step S12, FIG. 2B to FIG. 2E, FIG. 3A)

The chemical guide layer 12 is patterned. More specifically, in the chemical guide layer 12, first and second openings 121, 122 are formed. Note that FIG. 3A illustrates the state that the later-described mask resist layer 13 is removed.

The first opening 121 functions as a chemical guide to become the reference for dot row of the polymer P1 when a later-described diblock copolymer layer 15 (a layer of the diblock copolymer PB) self-assembles. In the first opening 121, the mold base material 11 having an affinity to the polymer P1 is exposed. On the other hand, around the first opening 121, the chemical guide layer 12 having an affinity to the polymer P2 is disposed. As a result of this, when the diblock copolymer BP self-assembles, the dot of the polymer P1 is preferentially arranged in the first opening 121. Periodically arranging a plurality of first openings 121 can control the arrangement of the dots of the polymer P1. In short, the cycle of the dot rows of the polymer P1 follows the cycle of the arrangement of the first openings 121.

Figure 2B:
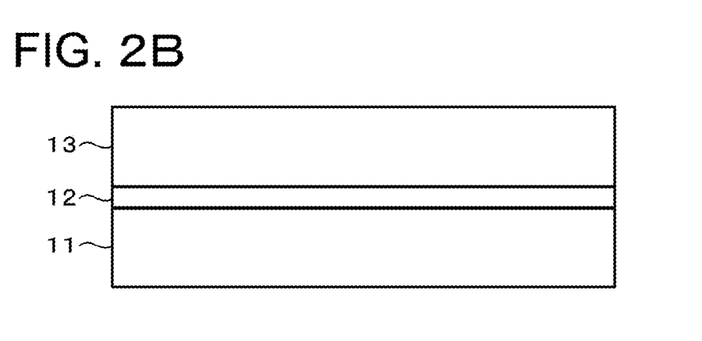
Figure 2C:
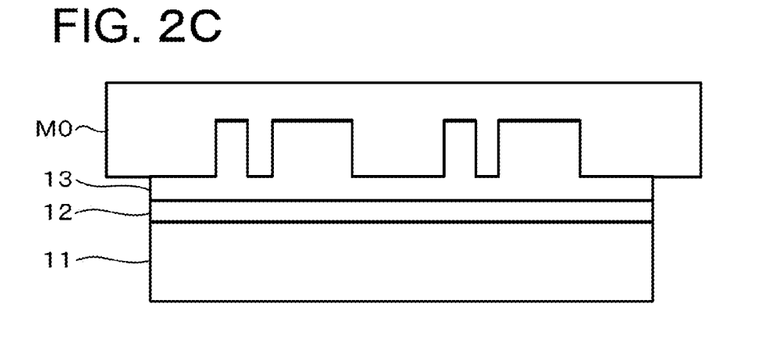
Figure 2D:
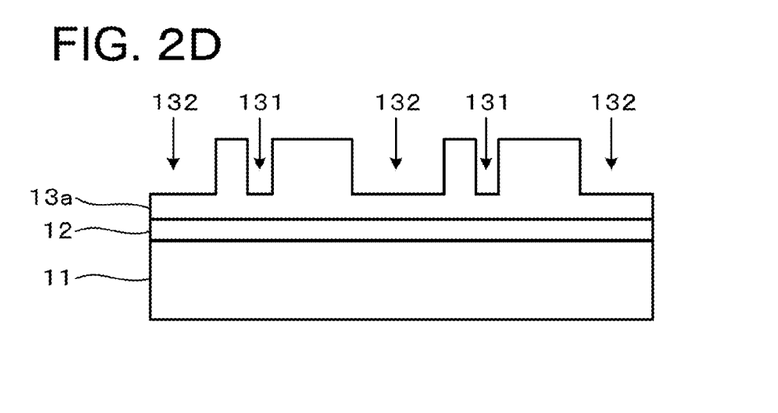
Figure 2E:
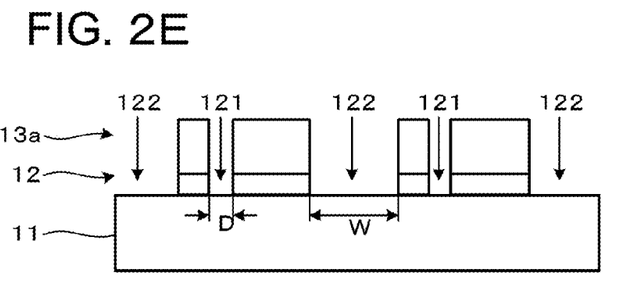

The first opening 121 is, for example, in a circular shape with a diameter D (for example, D=15 nm) (see FIG. 2E). As will be described later, for creating a magnetic recording medium with a recording density C equal to or higher than 1 [Tb/inch$^2$], it is necessary to set the size of the first opening 121 to be equal to or smaller than 15 [nm]. Further, the first opening 121 may be in a shape other than the circular shape, such as an elliptical shape, a rectangular shape or the like. A certain degree of freedom is given to the shape of the first opening 121 as long as it serves as the reference for the arrangement of the dot row of the polymer P1. However, a shape with a larger aspect ratio (a flat elliptical shape, an elongated rectangular shape or the like) is not preferable because it causes uncertainty of the position of the dot of the polymer P1 with respect to the first opening 121. In other words, it is preferable that the aspect ratio of the first opening 121 is close to 1.

The second opening 122 is an area where a later-described physical guide 14 is disposed. The physical guide 14 functions as a mask for inhibiting the formation of the diblock copolymer layer 15 (the dot row of the polymer P1). The second opening 122 can be made corresponding to a servo area of the magnetic recording medium.

The second opening 122 is, for example, in a rectangular shape with a width W equal to or greater than four times the diameter D (for example, W≥60 nm) (see FIG. 2E). The second opening 122, however, generally has an area where the physical guide 14 projects (see FIG. 3B, FIG. 5B, corresponding to the servo area of the magnetic recording medium (corresponding to an area A02 in FIG. 3D)), and is not in a simple rectangular shape but in a shape made by combining a plurality of rectangles in many cases.

The size of the second opening 122 is larger than the size of the first opening 121. As has been described, the first opening 121 is, for example, in the circular shape with the diameter D, and the second opening 122 is in the rectangular shape with the width W. In this case, the width W is larger than the diameter D. The aspect ratios of the first and second openings 121, 122 are possibly different from 1 here. In particular, the aspect ratio of the second opening 122 is very likely to be different from 1. In this case, the sizes of the first and second openings 121, 122 are compared using a smaller size (the width or the like) as a reference. For example, when a width W1 in the vertical direction of the second opening 122 is larger than a width W2 in the horizontal direction, the smaller width W2 is compared to the size (for example, the diameter D) of the first opening 121.

Patterning of the chemical guide layer 12 can be performed, for example, by the following procedures 1) to 3).

1) Formation of the Mask Resist Layer 13 on the Chemical Guide Layer 12 (FIG. 2B)

The mask resist layer 13 is formed on the chemical guide layer 12. As the mask resist layer 13, for example, an acrylic photopolymer, an epoxy photopolymer, or a novolac, PMMA, or PVA (polyvinyl alcohol) resin material can be applied.

Hereinafter, the mask resist layer 13 is patterned. Patterning by an imprint method will be described here as one example.

2) Pressing of an Imprint Mold M0 Against the Mask Resist Layer 13 (FIG. 2C)

The imprint mold M0 is pressed against the mask resist layer 13.

The imprint mold M0 is produced in advance as follows. Specifically, a layer of resist (mask material) is formed on the base material (raw material) of the imprint mold M0. The resist is patterned by exposure with electron beams and development. Using the patterned resist as a mask, the base material of the imprint mold M0 is processed. In this manner, the imprint mold M0 is formed.

Note that the exposure pattern of the electron beams is, for example, a guide pattern for BPM (a servo pattern and an array controlling pattern)). In this case, the imprint mold M0 is an imprint mold for transferring the guide pattern.

3) Hardening of the Mask Resist Layer 13 (FIG. 2C, FIG. 2D)

With the imprint mold M0 pressed against, the mask resist layer 13 is hardened. As a result of this, the mask resist layer 13 is patterned into a shape corresponding to the imprint mold M0. The mask resist layer 13 is hardened, for example, by application of ultraviolet rays, cooling, or pressurization.

In the case of hardening the mask resist layer 13 by application of ultraviolet rays, an ultraviolet curable resin curing with ultraviolet rays is used as the material of the mask resist layer 13.

In the case of hardening the mask resist layer 13 by cooling, a thermoplastic resin is used as the material of the mask resist layer 13. A replica mold M1 is pressed against the mask resist layer 13 softened by heating, and the mask resist layer 13 is then cooled to be hardened.

In the case of hardening the mask resist layer 13 by pressurization, a solvent is added to the material of the mask resist layer 13. By pressurizing the mask resist layer 13, the solvent is pushed out of the mask resist layer 13 to harden a resist layer 22.

4) Processing of the Chemical Guide Layer 12 (FIG. 2E)

Using the patterned mask resist layer 13 as a mask, the chemical guide layer 12 is processed. The chemical guide layer 12 is dry-etched, for example, with oxygen plasma. As a result of this, the first and second openings 121, 122 are formed in the chemical guide layer 12.

Figure 2F:
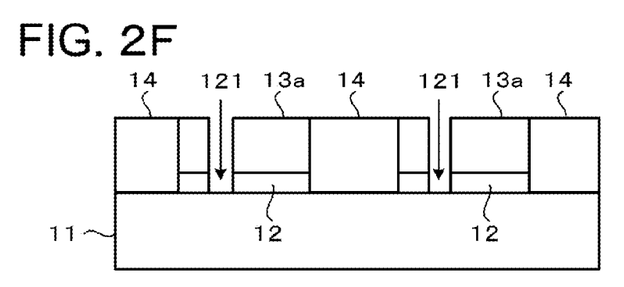
Figure 2G:
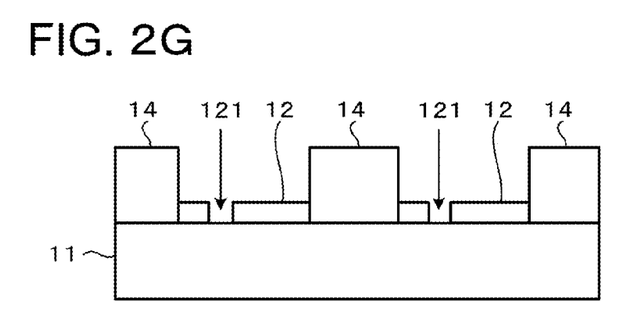
Figure 3B:
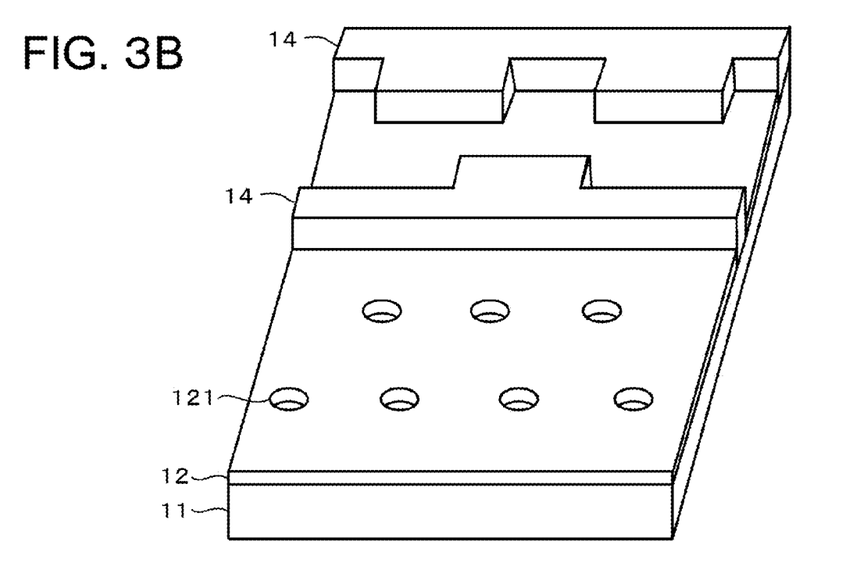
Figure 4A:
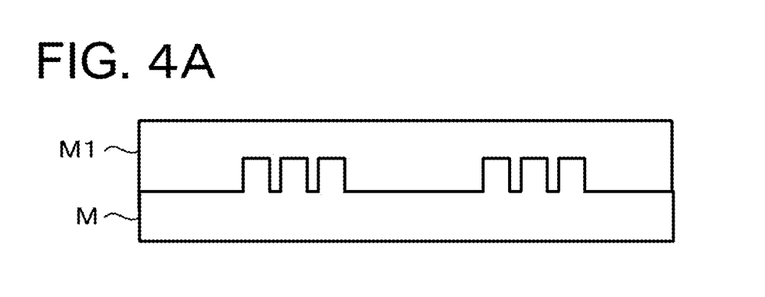
FIGS. 4A to 4C are views illustrating the procedure of manufacturing a magnetic recording medium using the mold M.
Figures 4B, 4C:
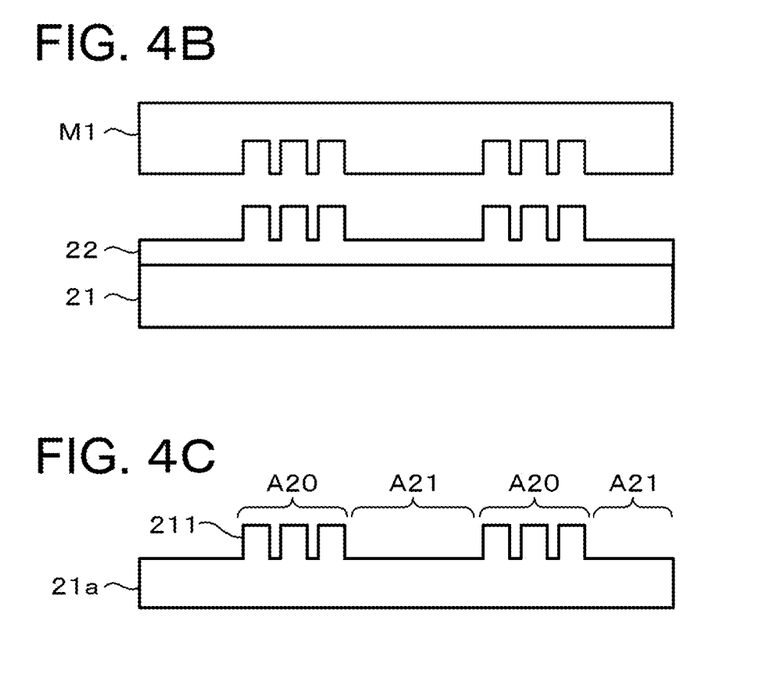

(3) Formation of the Physical Guides 14 (Step S13, FIG. 2F, FIG. 2G, FIG. 3B)

1) Formation of the Physical Guides 14 on the Mold Base Material 11 (FIG. 2F)

A solution of resist (guide resist) for the physical guides 14 is poured into the second openings 122. For the pouring, for example, a spin-coating method, a dip method, or an inkjet method can be used. In the spin-coating method, the solution of the guide resist is dropped while the mold base material 11 is rotated. In the dip method, the mold base material 11 is immersed into the solution of the guide resist. In the inkjet method, the solution of the guide resist is jetted from fine openings of a nozzle disposed close to the mold base material 11.

Appropriate selection of the molecular weight and the viscosity of a guide resist material makes it possible to fill only the second openings 122 (corresponding to non-magnetic areas) without filling the first openings 121.

The diameter D of the first opening 121 is set to 15 nm for instance. The width W of the second opening 122 is set to 60 nm. The diameter of 15 nm is a dimension of a hall pattern corresponding to a density of 1 Tb/in$^2$ that is the target of a next-generation high-density HDD. In this case, the smallest part of the second opening 122 (a non-magnetic area) is 60 nm that is four times of 15 nm (in other words, two cycles of dot/space).

Figure 6:
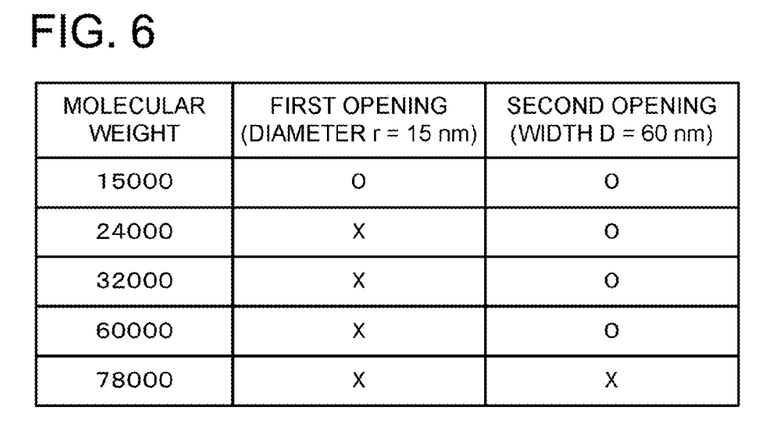
FIG. 6 is a table indicating the relation between the molecular weight of the guide resist material and the presence or absence of filling into first and second openings 121, 122.
Figure 7:
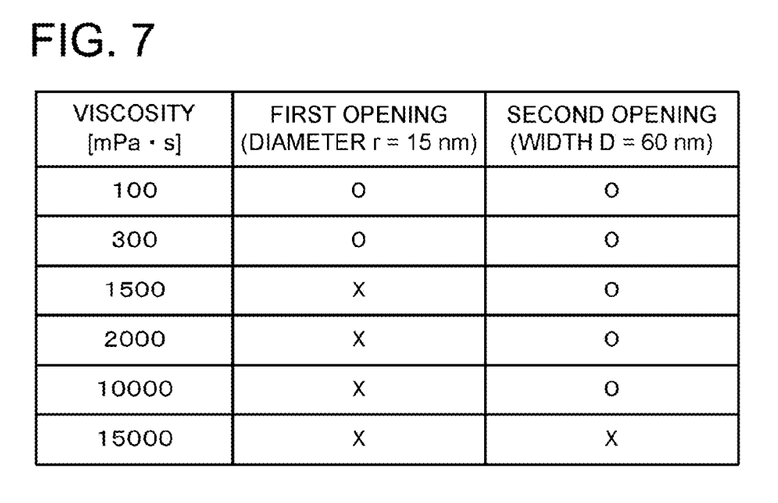
FIG. 7 is a table indicating the relation between the viscosity of the guide resist material and the presence or absence of filling into the first and second openings 121, 122.

An experiment of applying the guide resist material to the first opening 121 with a diameter of 15 nm and the second opening 122 with a width of 60 nm was carried out by the spin-coating method. FIG. 6 and FIG. 7 indicate the presence or absence of filling into the first and second openings 121, 122. FIG. 6 indicates the relation between the molecular weight of the guide resist material (styrene-PMMA copolymer) and the presence or absence of filling. FIG. 7 indicates the relation between the viscosity of the guide resist material (PMMA) and the presence or absence of filling. In the tables, "O" and "X" represent capability of filling and incapability of filling, respectively.

As indicated in FIG. 6, FIG. 7, when the molecular weight or the viscosity is sufficiently low, the guide resist material is filled not only in the second opening 122 (a relatively large pattern) but also in the first opening 121 (a fine pattern). When the molecular weight or the viscosity is increased, the guide resist material is no longer filled in the first opening 121 (a fine pattern). When the molecular weight or the viscosity is further increased, the guide resist material is no longer filled even in the second opening 122 (a relatively large pattern).

It is preferable here that the guide resist material is filled in the second opening 122 but not in the first opening 121. It is found from FIG. 6 that the molecular weight satisfying that condition is equal to or greater than 24000 and equal to or less than 60000. It is also found from FIG. 7 that the viscosity satisfying that condition is equal to or greater than 1500 mPa·s and equal to or less than 10000 mPa·s.

The viscosity indicated in FIG. 7 here is measured at 25° C. However, the resist material is designed so that its viscosity is comparatively stable in a use temperature range (room temperature range) in order to have a process margin. Therefore the viscosities in FIG. 7 are satisfied at a temperature in the room temperature (equal to or higher than 20° C. and equal to or lower than 25° C.)

2) Removal of the Mask Resist Layer 13 (FIG. 2G, FIG. 3B)

After the formation of the physical guides 14, the mask resist layer 13 is removed by wet etching. The dry etching, when used for the removal, may adversely affect the chemical guide layer 12. More specifically, the chemical guide layer 12 may be etched. Alternatively, the chemical guide layer 12 may lose its chemical properties (for example, the affinity to the second polymer P2 may be lost). The solution for the wet etching is selected to dissolve the mask resist layer 13 (mask resist) but not to dissolve the physical guides 14 (guide resist).

When the mask resist is novolac, an acid or alkali solution can be selected as the solution for the wet etching. The novolac mask resist can be removed with the acid or alkali solution. In this case, a styrene or PMMA photopolymer that is insoluble in acid or alkali is preferable as the guide resist.

When the mask resist is PVA, pure water can be selected as the solution for the wet etching. The PVA mask resist can be removed with pure water. In this case, a styrene, epoxy, or novolac material that is insoluble in pure water is preferable as the guide resist.

It is also important that the etching solution does not substantially erode the chemical guide layer 12. If the etching solution is acid, alkali or pure water, PS, PDMS, PMMA or a standard silane coupling agent used as the constituent material of the chemical guide layer 12 (chemical guider material) is not eroded. Further, if the chemical guide layer 12 is anchored to the surface of the mold base material 11, the etching solution may be an organic solvent (for example, anisole or PGMEA (Propylene Glycol Monomethyl Ether Acetate)).

Figure 2H:
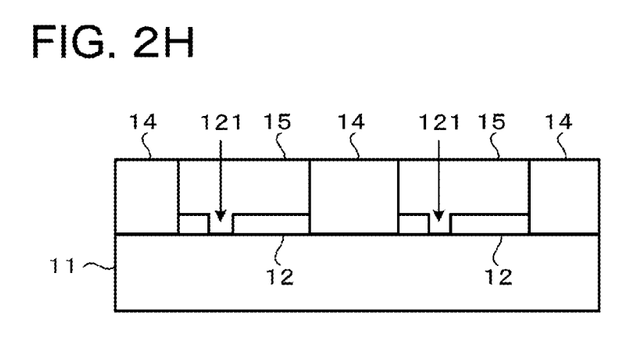

(4) Formation of the Diblock Copolymer Layer 15 (a Second Layer) (Step S14, FIG. 2H)

The diblock copolymer layer 15 is formed. To this end, a liquid diblock copolymer BP (desirably, PS-PDMS, or other PS-PMMA, PMMA-PMAPOSS, PS-PEO or the like) is poured between the physical guides 14 (and onto the chemical guide layer 12).

Figure 2I:
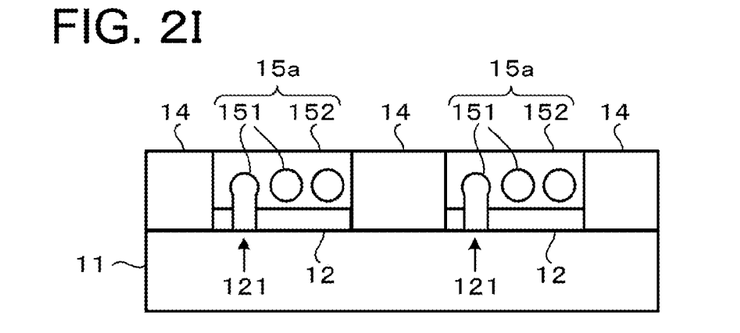
Figure 3C:
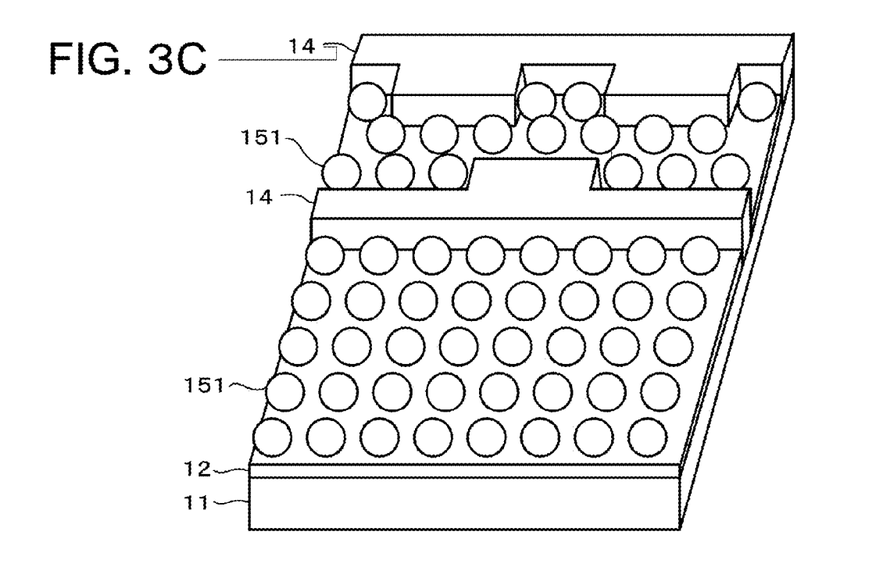

(5) Self-Assembly of the Diblock Copolymer BP (Step S15, FIG. 2I, FIG. 3C)

The diblock copolymer BP is annealed. As a result of this, the diblock copolymer layer 15 changes into a diblock copolymer layer 15a having separated polymers P1, P2. Rows of dots 151 of the polymer P1 (for example, PDMS) are formed, and the polymer P2 surrounds them. As has been described, the rows of dots 151 are arrayed corresponding to the first openings 121 (chemical guides).

Note that in place of the dots 151, cylinders of the polymer P1 can be used. More specifically, the shape of the diblock copolymer BP by self-assembly may be a cylindrical shape. This is because dots 111 in a dot shape are formed by etching even if the shape of the polymer P1 is in the cylindrical shape in later-described processing of the mold base material 11.

Figure 2J:
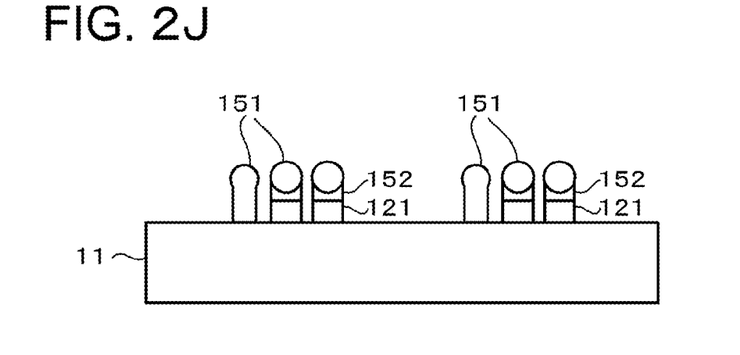
Figure 3D:
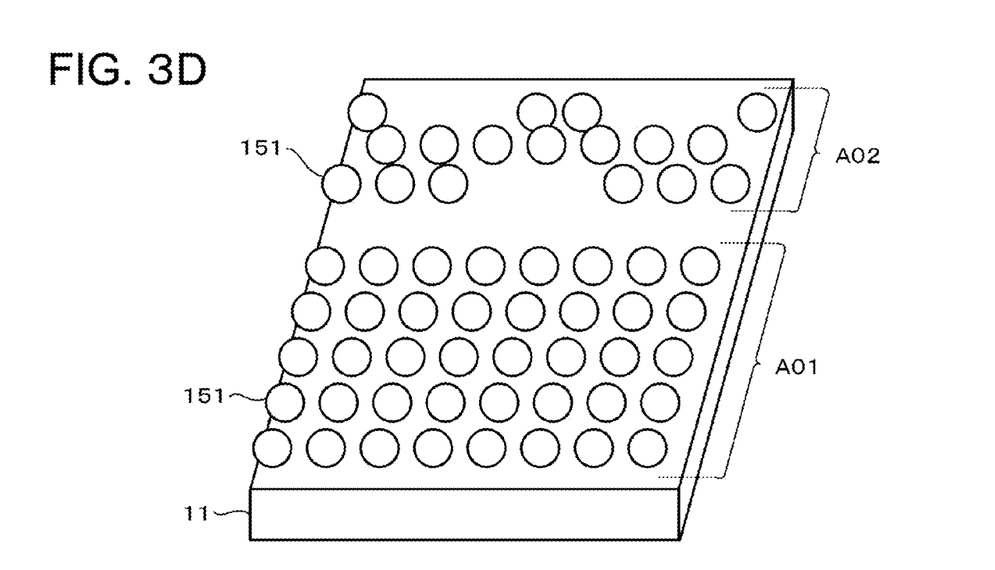

(6) Removal of the Physical Guides 14 (Step S16, FIG. 2J, FIG. 3D)

The physical guides 14 are removed by dry etching using, for example, oxygen (O$_2$) plasma. In the area where the physical guide 14 has been removed, no dots 151 (or the cylinders) exist. As has been described, this area corresponds, for example, to the non-magnetic area of the magnetic recording medium.

The polymer P2 is also etched here by the dry etching. More specifically, using the dots 151 of the polymer P1 (for example, PDMS) as a mask, the polymer P2 (PS) is etched. As a result of this, dots 152 of the polymer P2 and dots 121 of the chemical guide layer 12 are formed behind the dots 151.

As will be described later, areas A01, A02 illustrated in FIG. 3D correspond to a data area and a servo pattern area of the BPM respectively.

Figure 2K:
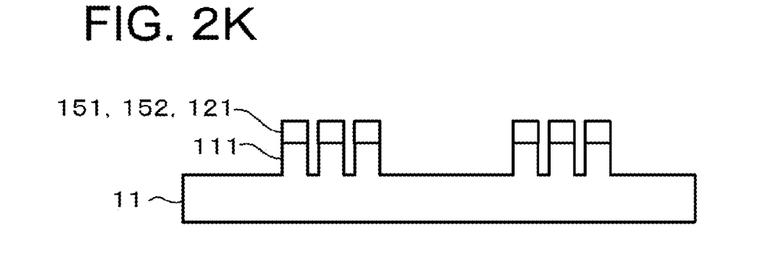
Figure 2L:
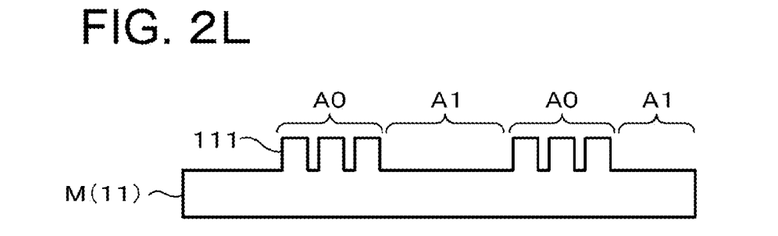

(7) Processing of the Mold Base Material 11 (Step S17, FIG. 2K, FIG. 2L)

Using the dots 151 of the polymer P1 (for example, PDMS) as a mask, the mold base material 11 is processed. For the processing, for example, dry etching with $CF_4$ can be used. As a result of this, the dots 111 corresponding to the dots 151 are formed (see, FIG. 2K).

Thereafter, using wet etching or dry etching using oxygen ($O_2$) plasma, the remaining masks (the dots 151, 152, 121) are removed. In this manner, the mold M having the area A0 with the dots 111 and the flat area A1 is formed (see, FIG. 2L).

This mold M can be used as an imprint mold for manufacturing the magnetic recording medium (BPM or the like) having the data area and the servo pattern area. By appropriately arranging the areas A0, A1, both the data area where the dots are accurately arrayed and the servo pattern area formed with presence or absence of the aggregate of dots can be formed. As has been described, the areas A01, A02 illustrated in FIG. 3D correspond to the data area and the servo pattern area respectively.

Thereafter, a replica mold M1 made by replicating this mold M is produced as necessary (FIG. 4A). The replica mold M1 is produced using the mold M as a die, for example, by an electroforming method (electroplating), an injection molding method, an extrusion molding method, a thermal transfer method or the like. Note that the mold M may be used as it is without replicating the mold M.

The pattern of the replica mold M1 is transferred to the resist layer 22 provided on a magnetic material layer 21 (FIG. 4B). For the transfer, the imprint method can be used. For example, a liquid resist layer 22 is hardened with the replica mold M1 pressed against the resist layer 22. The resist layer 22 is hardened, for example, by application of ultraviolet rays, cooling, or pressurization.

In the case of hardening the resist layer 22 by application of ultraviolet rays, an ultraviolet curable resin curing with ultraviolet rays is used as the material of the resist layer 22.

In the case of hardening the resist layer 22 by cooling, a thermoplastic resin is used as the material of the resist layer 22. The replica mold M1 is pressed against the resist layer 22 softened by heating, and the resist layer 22 is then cooled to be hardened.

In the case of hardening the resist layer 22 by pressurization, a solvent is added to the material of the resist layer 22. By pressurizing the resist layer 22, the solvent is pushed out of the resist layer 22 to harden the resist layer 22.

Among them, the method of using application of ultraviolet rays is preferable in that a finer pattern can be accurately transferred (a UV imprint method).

Using the pattern resist layer 22 as a mask, the magnetic material layer 21 is processed, for example, by dry etching or milling, and the resist layer 22 is removed. As a result of this, a magnetic material film 21a having an area A20 with dots 211 and an area A21 without dots 211 is formed (see FIG. 4C). Note that the magnetic material layer 21 is typically formed on a substrate such as a glass substrate.

Thereafter, the magnetic recording medium (BPM or the like) is produced. For the production, processes such as planarization, surface polishing (tape varnish), lubricant application are used. In the planarization process, the magnetic material film 21a is planarized by filling a non-magnetic material in the dots 211 of the magnetic material film 21a. In the surface polishing, for example, the planarized magnetic material film 21a is polished with a tape-like polishing material. The application of the lubricant is for further smoothing the surface of the polished magnetic material film 21a.

Figure 5A:
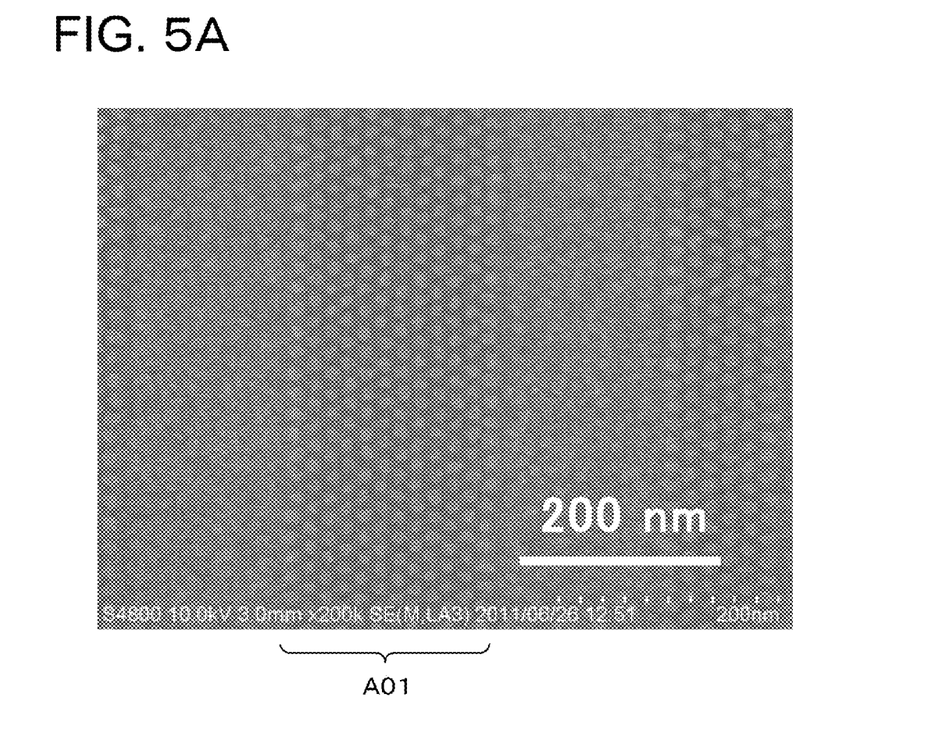
FIG. 5A and FIG. 5B are electron micrographs of an example of the magnetic recording medium.
Figure 5B:
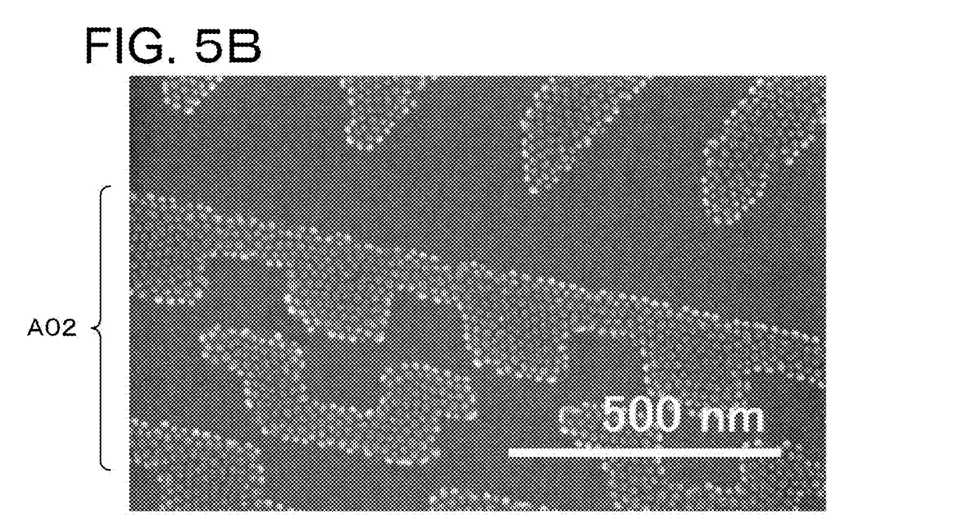

FIG. 5A, FIG. 5B are electron micrographs of an example of the magnetic recording medium (BPM). The areas A01, A02 in FIG. 5A, FIG. 5B correspond to the data (a data track) area and the servo pattern area. In the area A01 (the data track area), magnetic dots are orderly arrayed to correspond to the openings 121. In the area A02 (the servo pattern area), a servo pattern is formed of an area with dots and an area without dots. Specifically, the area without dots is formed by the arrangement of the physical guide 14.

Figure 8:
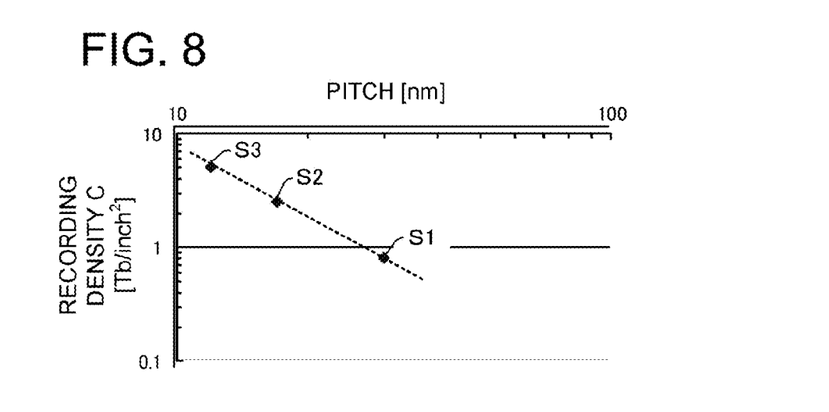
FIG. 8 is a graph indicating the relation between the pitch of the magnetic dots and the recording density.

FIG. 8 is a graph indicating the relation between the pitch P of the magnetic dot and the recording density C. At points S1 to S3, the pitches P are 30, 17, 12 [nm] and the recording densities C are 0.8, 2.5, 5.0 [Tb(Tera bit)/inch$^2$] respectively. When the target of the recording density C is 1 [Tb/inch$^2$] or greater, the pitch P is about 30 [nm] or less, and the diameter of the magnetic dot is about 15 [nm] or less that is the half of the pitch P. Since the size of the first opening 121 corresponds to the size of the magnetic dot, the size of the first opening 121 needs to be made 15 [nm] or less in order to achieve a recording density C of 1 [Tb/inch$^2$] or greater.

(Magnetic Recording/Reproducing Apparatus)

Figure 9:
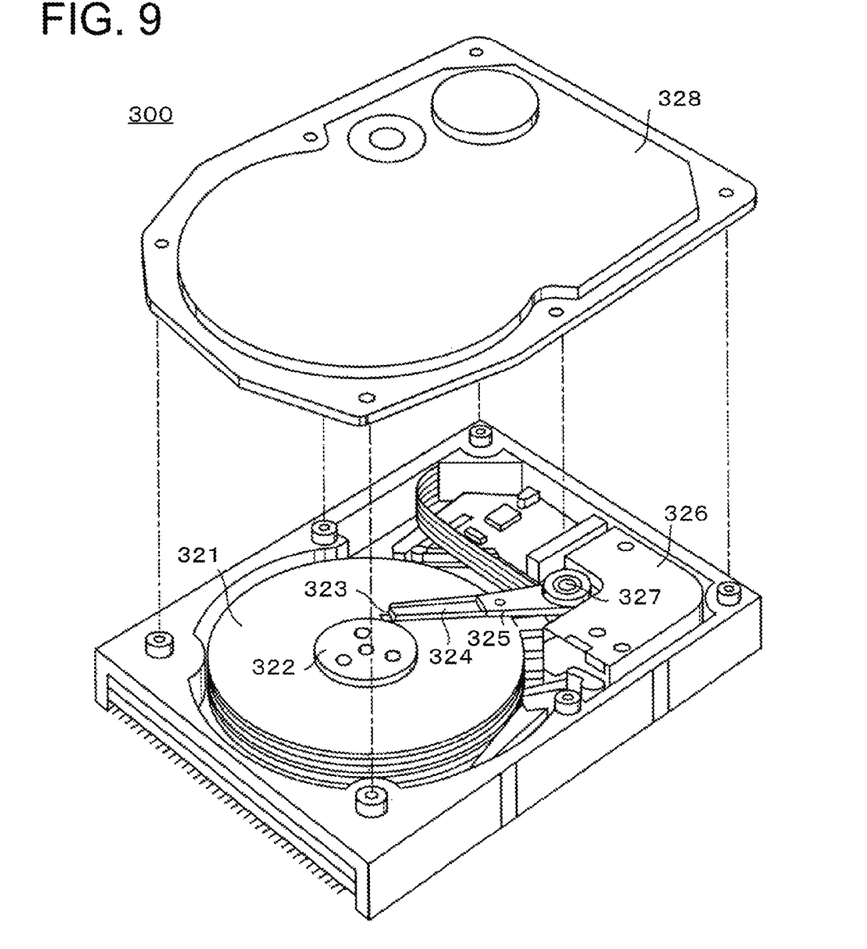
FIG. 9 is a structural view of a magnetic recording/reproducing apparatus 300.

FIG. 9 is a structural view of a magnetic recording/reproducing apparatus 300 using a bit patterned magnetic recording medium (BPM) of this embodiment.

The magnetic recording/reproducing apparatus 300 has a magnetic disk 321 for recording information thereon. The magnetic disk 321 is a hard structure and is composed of a bit patterned magnetic recording medium. The magnetic disk 321 is attached to a spindle 322, and driven to rotate at a fixed number of rotations by a not-illustrated spindle motor. A slider 323 mounting thereon, for example, a single-pole magnetic recording head and an MR head for recording and reproducing information on/from the magnetic disk 321. The slider 323 is attached to the tip of a suspension 324 composed of a leaf spring in a thin film shape. The suspension 324 is connected to one end side of an arm 325 having a bobbin part or the like retaining a not-illustrated driving coil.

On the other end side of the arm 325, a voice coil motor 326 that is a kind of a linear motor is provided. The voice coil motor 326 is composed of not-illustrated driving coil and magnetic circuit. The driving coil is composed of a conductive wire wound around the bobbin part of the arm 325. The magnetic circuit is composed of a permanent magnet and a counter yoke arranged to face each other with the driving coil interposed between them.

The arm 325 is held by not-illustrated ball bearings provided at two top and bottom places of a fixed shaft 327 and driven to rotate and swing by the voice coil motor 326. In other words, the position of the slider 323 on the magnetic disk 321 is controlled by the voice coil motor 326. Note that a lid body 328 is a lid sealing the magnetic recording/reproducing apparatus 300.

Figure 10:
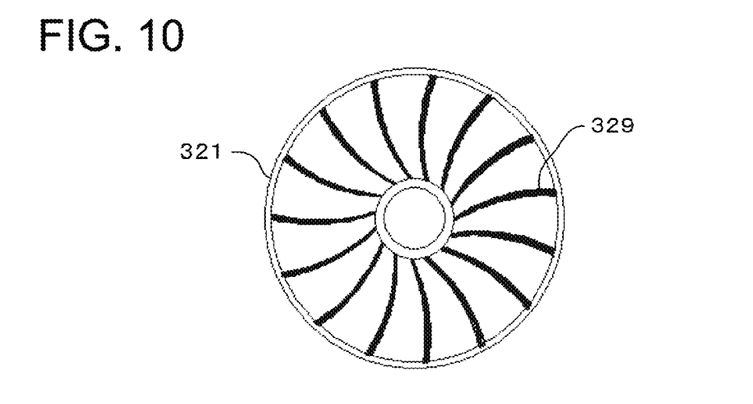
FIG. 10 is a schematic view of a magnetic disk 321.

As illustrated in FIG. 10, the magnetic disk 321 has, for example, a radial servo pattern area 329. The servo pattern area 329 is an area where address information is stored. When recording and reproducing information on/from the magnetic disk 321, the address information is used for positioning recording and reproducing heads.

As described above, according to this embodiment, the mold M having the area A0 with rows of the dots 111 (a dot pattern) and the area A1 without rows of dots 111 (a dot pattern) can be accurately produced. Use of the chemical guide (corresponding to the first opening 121) enables accurate production of the dot row using the self-assembly method at low cost with good throughput. Further, use of the physical guide 14 (corresponding to the second opening 122) enables accurate positioning of the boundary between the areas A0 and A1. In other words, by using both the chemical guide (corresponding to the first opening 121) and the physical guide 14 (corresponding to the second opening 122), the positional accuracy of both of the array of dots 111 and the boundary between the areas A0 and A1 are improved.

This embodiment is applicable to an ordered medium in place of the BPM here. The ordered medium is a medium in which one mark is composed of several dots which is different from a bit-patterned medium in which one mark corresponds to one dot.

It is conceivable that the dots are formed of a granular continuous film into the ordered medium. The granular continuous film is composed of a group of magnetic domains which are not controlled but comparatively random, and thus has a possibility that the magnetic domains are inverted due to thermal fluctuation or the like. If the individual dots are isolated in the ordered medium and accurately arrayed, it is possible to improve the resistance against the thermal fluctuation or the like and form high-quality marks for the granular continuous film.

It is necessary that the dots are accurately arrayed also in the ordered medium as in the bit-patterned medium, and it is desirable that the servo pattern is simultaneously processed in terms of cost. Therefore, the method according to this embodiment of accurately arraying the dots by the chemical guides and forming the servo patterns by the physical guides is also effective in the ordered medium.

Further, still another conceivable embodiment is applicable to the semiconductor field. It is tried to accurately form a fine wiring in a short time by the self-assembly phenomenon (for example, a lamellar micro phase separation) also in the semiconductor. For this case, the chemical guide is effective to improve the positional accuracy of the wiring. It is necessary to provide an area with a wiring pattern and an area without a wiring pattern in the semiconductor. In this case, the boundary between them (a pattern) can be accurately and arbitrarily formed by using also the physical guide.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a mold, comprising:
    forming a first layer, having a greater affinity to a second polymer than to a first polymer, on a substrate having a greater affinity to the first polymer than to the second polymer;
    forming first openings and second openings in the first layer, the second openings being larger in size than the first openings;
    applying a resist as a liquid on the first layer to fill the resist in the second openings, but not in the first openings;
    hardening the resist filled in the second openings to obtain a hardened resist;
    forming a second layer, containing a block copolymer having the first and second polymers, in the first openings and on the first layer;
    causing the block copolymer to self-assemble to form a dot row arranged corresponding to the first openings and containing the first polymer;
    removing the hardened resist;
    processing the substrate using the dot row as a mask to form a mold having a first area with a shape corresponding to the dot row and a flat second area corresponding to the second openings; and
    removing the first and second layers.

2. The method according to claim 1,
    wherein the size of the first openings is 15 nm or less; and
    wherein the resist includes a polymer having a molecular weight equal to or greater than 24000 and equal to or less than 60000.

3. The method according to claim 2,
    wherein the size of the second openings is equal to or greater than four times the size of the first openings.

4. The method according to claim 1,
    wherein the size of the first openings is 15 nm or less; and
    wherein the resist has a viscosity equal to or greater than 1500 mPa·s and equal to or less than 10000 mPa·s.

5. The method according to claim 4,
    wherein the size of the second openings is equal to or greater than four times the size of the first openings.

6. The method according to claim 1,
    wherein the forming of the first openings and second openings, comprises:
        forming a layer of a second resist on the first layer;
        processing the layer of the second resist to have a shape corresponding to the first and second openings; and
        etching the first layer using the processed layer of the second resist as a mask to form the first and second openings,
    the method further comprising removing the processed layer of the second resist after the filling and hardening a resist.

7. The method according to claim 6,
    wherein the processing of the layer of the second resist comprises:
        pressing a mold having first and second projections corresponding to the first and second openings against the layer of the second resist; and
        hardening the layer of the second resist against which the mold is pressed.

8. The method according to claim 6,
    wherein a material of the second resist is novolac, PMMA, or PVA.

9. The method according to claim 8, further comprising removing the layer of the second resist by wet etching.

10. The method according to claim 1,
    wherein the block copolymer is at least any one of PS (polystyrene)-PDMS (polydimethylsiloxane), PS-PMMA (polymenthyl methacrylate), PMMA-PMAPOSS (polymethacrylate containing polyhedral oligomeric silsesquioxane), and PS-PEO (polyethylene oxide).

11. The method according to claim 1,
    wherein, in the forming of a dot row, the block copolymer self-assembles by annealing.

* * * * *